United States Patent Office 3,637,618
Patented Jan. 25, 1972

3,637,618
UNSATURATED POLYESTERS FROM EPOXIDES AND ETHYLENICALLY UNSATURATED MONOCARBOXYLIC ACID MIXED WITH SOLID EPOXIDE RESIN
Clayton A. May, Orinda, Calif., assignor to Shell Oil Company, New York, N.Y.
No Drawing. Continuation-in-part of application Ser. No. 764,957, Oct. 3, 1968, which is a continuation-in-part of application Ser. No. 411,138, Nov. 13, 1964. This application Mar. 11, 1970, Ser. No. 18,696
Int. Cl. C08g 45/04
U.S. Cl. 260—837 R
13 Claims

ABSTRACT OF THE DISCLOSURE

New curable polyester compositions having controlled viscosity which eliminate surface tack and which impart improved chemical resistance to glass reinforced structures are disclosed. These compositions comprise a mixture of (A) a soluble, curable unsaturated polyester of (1) a normally liquid polyepoxide and (2) an ethylenically unsaturated organic carboxylic acid and (B) a dissimilar normally solid polymeric material possessing a plurality of epoxy groups. Also disclosed are the above-defined compositions containing an ethylenically unsaturated monomer, such as styrene.

BACKGROUND OF THE INVENTION

This application is a continuation-in-part application of application Ser. No. 764,957, filed Oct. 3, 1968, now abandoned, which was a continuation-in-part application of application Ser. No. 411,138, filed Nov. 13, 1964, now U.S. 3,420,914, issued Jan. 7, 1969.

Cured polyepoxides have many desirable properties such as solvent and chemical resistance and good adhesion to metal and there has been an increasing desire to transfer many of these desirable properties over to the conventional polyester type products. This can be accomplished by reacting the polyepoxides, particularly the so-called liquid resins, with an unsaturated monocarboxylic acid, such as, for example, methacrylic acid. The products prepared in this manner can be cured in the presence of peroxide catalysts to form products having the desired characteristics of the polyepoxides as well as those of the unsaturated polyesters.

The use of these products for certain applications, however, is rather limited because of the low viscosity of the products. It was found that the viscosity could be controlled by the addition of certain vinyl acetate polymers. Although this modification allows the control of the viscosity to a large extent, there was still need to increase the viscosity, to eliminate the surface tack and to improve the chemical resistance of glass reinforced laminates.

In other words, the polymer additives such as the vinyl acetate polymers, increased the viscosity and imparted good chemical resistance, such as resistance to caustic such as NaOH. However, when these polyesters are used to prepare glass laminates, the resulting laminates have very poor resistance to NaOH. It was quite surprising to find that when the polymer additive was a solid glycidyl polyether of 2,2-bis(4-hydroxyphenyl)propane, the NaOH resistance in glass laminates was significantly improved.

It has now been discovered that these desirable properties are obtained by a composition comprising a mixture of (1) a soluble, curable, unsaturated polyester of a polyepoxide possessing more than one vic-epoxy group and preferably a liquid glycidyl polyether and an ethylenically unsaturated organic carboxylic acid, such as methacrylic acid and (2) a solid glycidyl polyether of a polyhydric phenol, and optionally, an unsaturated monomer such as styrene.

SUMMARY OF THE INVENTION

A curable composition which exhibits reduced surface tack and which imparts improved chemical resistance to glass laminates comprises a mixture of (1) an unsaturated polyester reaction product of a normally liquid polyepoxide containing more than one vic-epoxy group and an unsaturated monocarboxylic acid and (2) a normally solid glycidyl polyether of a polyhydric phenol and, optionally, an unsaturated monomer.

Surprisingly, it has been found that these new compositions can be prepared with a variety of viscosities by controlling the amount of the additive solid glycidyl polyether added to the mixture. By thus controlling the properties, one is able to obtain products having a wide range of viscosities which can be used for a great variety of different applications. It has further been found that the presence of this solid polyether additive imparts unexpected improvement in the properties of the cured products, such as reduced surface tack and improved chemical resistance, hardness and distensibility.

DESCRIPTION OF THE PREFERRED EMBODIMENT

It has been found that the above-described improvements in physical properties are obtained by curable compositions comprising (1) 100 parts by weight of an unsaturated polyester prepared by reacting a normally liquid polyepoxide possessing more than one vic-epoxy group and preferably a liquid glycidyl polyether, and an ethylenically unsaturated organic carboxylic acid, preferably a monocarboxylic acid such as methacrylic acid and (2) from 0.1 to 25 parts by weight of a solid glycidyl polyether of a polyhydric phenol or a polyhydric alcohol and preferably a glycidyl polyether of 2,2-bis(4-hydroxyphenyl)propane and, optionally, (3) from about 1 to about 200 parts by weight of an unsaturated monomer such as styrene.

As a special embodiment, the invention provides a special class of curable compositions which have varying viscosities and are particularly adapted for use in the preparation of laminated products possessing tack-free properties and improved chemical resistance. These special compositions comprise a mixture of (1) 100 parts by weight of an unsaturated polyester having the formula:

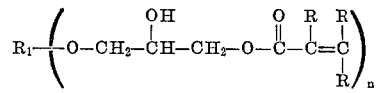

wherein $R_1$ is an aromatic radical, R is hydrogen or alkyl and $n$ is an integer of at least 2, and preferably 2 to 6 and (2) from 0.1 to 25 parts by weight of the above-noted glycidyl polyether and optionally (3) from 1 to 200 parts by weight of styrene.

The unsaturated polyesters used in making the new compositions of the invention are those obtained by reacting normally liquid polyepoxides having more than one vic-epoxy group with ethylenically unsaturated organic acids.

The liquid polyepoxides used in the process of the invention comprise those compounds possessing more than one vic-epoxy group, i.e., more than one

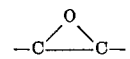

group. These polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of liquid polyepoxides that may be used in the process of the invention are given in U.S. 2,633,458 and it is to be understood that so much of the disclosure of that patent relative to examples of polyepoxides is incorporated by reference into this specification.

Other examples include glycidyl ethers of novolac resins, i.e., phenol-aldehyde condensates. Preferred resins of this type aret hose of the formula:

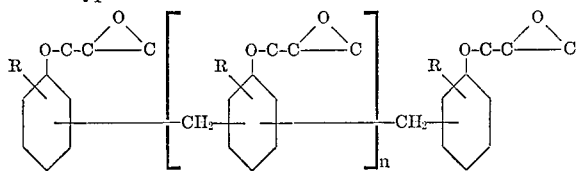

wherein R is hydrogen or an alkyl radical and $n$ has a value of from 0.1 to about 5, and preferably less than 1.0. Preparation of these polyepoxides is illustrated in U.S. 2,216,099 and 2,658,885.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecanedienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl adipate,
diglycidyl isopthalate,
di(2,3-epoxybutyl)adipate,
di(2,3-epoxybutyl)-oxalate,
di(2,3-epoxyhexyl)succinate,
di(3,4-epoxybutyl)maleate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybutyl)1,2,4-butanetricarboxylate,
di(5,6-epoxypentadecyl)maleate,
di(2,3-epoxybutyl)-azelate,
di(3,4-epoxybutyl)citrate,
di(5,6-epoxyoctyl)cyclohexane-1,3-dicarboxylate,
di(4,5-epoxyoctadecyl)malonate Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxy-3,4-epoxyhexyl, 3,4-epoxypentanoate; 3,4-epoxycyclohexyl 3,4-epoxycyclohexyl metyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate;
13-diepoxyeicosanedioate;
dihexyl 6,7,10,11-diepoxyhexadecanedioate;
didecyl-9-epoxyethyl-10,11-epoxyoctadecanedioate;
dibutyl 3-butyl-3,4,5,6-diepoxycyclohexane-1,2-dicarboxylate;
dicyclohexyl 3,4,5,6-diepoxycyclohexane-1,2-dicarboxylate;
dibenzyl 1,2,4,5-diepoxycyclohexane-1,2-dicarboxylate and
diethyl 5,6,10,11-diepoxyoctadecyl succinate.

Still another group comprises the epoxidized polyester obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting the diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Preferred liquid polyepoxides include the so-called liquid glycidyl polyethers of polyhydric phenols and polyhydric alcohols. Especially preferred are the glycidyl polyethers of 2,2-bis(4-hydroxyphenyl)propane having an average molecular weight between about 300 and 900 and an epoxide equivalent weight between about 140 and 500. Exceptionally good unsaturated polyesters are prepared from a liquid glycidyl polyether of 2,2-bis(4-hydroxyphenyl)propane having an average molecular weight of from about 350 to 400 and an epoxide equivalent weight of 175 to 200.

The other component in the reaction comprises an ethenically unsaturated organic carboxylic acid which may be aliphatic, cycloaliphatic or aromatic, and may be monocarboxylic or polycarboxylic. Examples of the acids to be utilized include acrylic acid, methacrylic acid, cyclohexene carboxylic acid, maleic acid, crotonic acid, alpha-phenylacrylic acid, tetrahydrophthalic acid, 2,4-octadienedicarboxylic acid, dodecadienoic acid and the like.

Particularly preferred acids to be utilized comprise the ethylenically unsaturated acids such as, for, example acrylic acid, methacrylic acid, crotonic acid, alpha-phenylacrylic acid, alpha-cyclohexylacrylic acid, maleic acid, alpha-chloromaleic acid, tetrahydrophthalic acid, itaconic acid, fumaric acid, cyanoacrylic acid, methoxyacrylic acid, and the like.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen, tetrahydrophthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

Coming under special consideration, particularly because of the superior coating properties of the resulting prepolymers, are the ethylenically unsaturated monocarboxylic acids and unsaturated partial esters thereof containing 3 to 10 carbon atoms, and the alkenyl and alkyl esters of alkenedioic acids containing up to 12 carbon atoms.

The unsaturated polyesters are preferably prepared by reacting the above components in the presence of a catalyst, such as a tertiary amine, phosphine or onium compound.

Preferred phosphines are the organic phosphines, i.e., compounds of the formula $$P(R)_3$$

wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trixylyl phosphine, trinaphthyl phosphine, tricyclohexenyl phosphine, tri(3,4-diethyloctyl)phosphine, trioctadecyl phosphine, dioctyldecyl phosphine, dicyclohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

Suitable tertiary amines include the trialkylamines such as trimethylamine, triethylamine, tripropylamine, etc., and the aromatic substituted derivatives thereof such as benzyldimethylamine, among others.

The preferred catalyst to be utilized in the process comprises the onium salts, and preferably those containing phosphorous, sulfur or nitrogen, such as, for example, the phosphonium, sulfonium and ammonium salts of inorganic acids. Examples of these include, among others, benzyltrimethylammonium sulfate, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium thiocyanate, triphenylsulfonium chloride, dicyclohexyldiamylphosphonium iodide, benzyltrimethylammonium thiocyanate, and the like, and mixtures thereof.

Preferred onium salts to be employed include those of the formulae

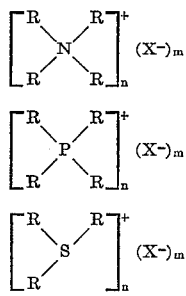

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, $m$ is the valency of the X ion and $n=m$.

The amount of the above-noted polyepoxide and acid to be used in the reaction may vary over a wide range. In general, these reactants are used in approximately chemically equivalent amounts. As used herein and in appended claims a chemical equivalent amount of the polyepoxide refers to that amount needed to furnish one epoxy group per carboxyl group. Excess amounts of either reactant can be used. Preferred amounts range from about 0.5 to 2 equivalents of epoxide per equivalent of carboxylic acid.

The amount of the catalyst employed may also vary over a considerable range. In general, the amount of the catalyst will vary from about .05% to about 3% by weight, and more preferably from .1% to 2% by weight of the reactants.

The reaction may be conducted in the presence or absence of solvents or diluents. In most cases, the reactants will be liquid and the reaction may be easily effected without the addition of solvents or diluents. However, in some cases whether either or both reactants are solids or viscous liquids it may be desirable to add diluents to assist in effecting the reaction. Examples of such materials include the inert liquids, such as ketones, xylene, toluene, cyclohexane and the like.

If solvents are employed in the reaction and the resulting product is to be used for coating purposes, the solvent may be retained in the reaction mixture. Otherwise, the solvent can be removed by any suitable method as by distillation and the like. If the product is not to be used for some time after its formation, it may also be desirable to remove the catalyst used in the preparation, such as by stripping and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.020 eq./100 g. or below.

The preparation may be effected in any suitable manner. The preferred method merely comprises adding the polyepoxide, acid, catalyst and solvent or diluent, if desired, in any order and then applying the necessary heat to bring about the reaction. The reaction mixture may then be distilled or stripped to remove any of the necessary components, such as solvents, catalyst, excess reactants and the like.

The polyester products by the above process will vary from liquids to solid resins. The products will possess a plurality of free OH groups, and in the case of the unsaturated acids, possess a plurality of ethylenic groups, and will be reactive through these groups. The products will be of higher molecular weight than the basic polyepoxide from which they are formed and will possess at least two acid groups per polyepoxide unit.

The polyesters will also possess a linear structure, i.e., free of cross-linking. As a result they will be soluble in acetone and other conventional solvents. They will be relatively non-heat reactive, i.e., difficult to body by heating alone. However, constant-application of heat may cause them to suddenly gel.

The new compositions of the present invention are prepared by mixing the above-described unsaturated polyethers prepared from liquid polyepoxides with a solid glycidyl polyether of a polyhydric alcohol or a polyhydric phenol such as 2,2-bis(4-hydroxyphenyl)propane.

Suitable solid glycidyl polyethers of 2,2-bis,4-hydroxyphenyl)propane include the so-called solid resins having an average molecular weight of from about 900 to about 5000 and an epoxide equivalent weight of from about 500 to about 2500 having the general formula

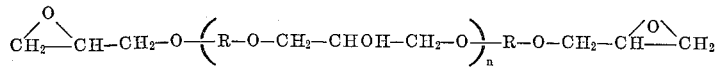

wherein $n$ is an integer of the series 0, 1, 2, 3, and R represents the divalent radical

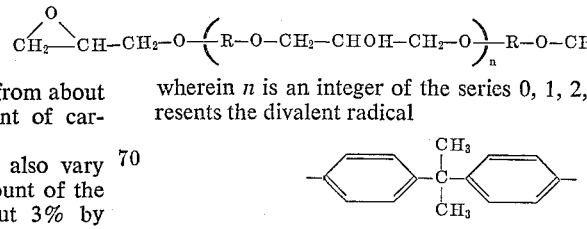

While for any single molecule, $n$ will be an integer, the fact that the polyether is a mixture of compounds causes the determined value of $n$, e.g., from molecular weight measurements, to be an average which is not necessarily zero or a whole number. It will be appreciated that the value of $n$ will be selected so that the final average molecular weight of the glycidyl polyether has the desired value, i.e., to produce a normally solid resin, viz a melting point above about 750° C.

Simply, the polyethers which are suitable for use in preparing the present condensates are prepared by heating 2,2-bis(4-hydroxyphenyl)propane (bis-phenol) with epichlorohydrin in a basic reaction medium. Depending upon the type (molecular weight range, etc.) of product desired, there is used from more than 1 to 2 or more moles of epichlorohydrin per mole of bis-phenol. Also present is a base, such as sodium hydroxide, generally in an amount of from about 5% to 30% stoichiometric excess of the epichlorohydrin, i.e., 1.05 to 1.3 equivalents of base per mole of epichlorohydrin. In effecting the reaction, the bis-phenol is mixed with an aqueous solution of the base and heated. The epichlorohydrin is then added rapidly to the stirred reaction mass. The initial reaction is somewhat exothermic so that a temperature rise occurs to some extent. After addition of the epichlorohydrin, heating is applied for several hours while stirring in order to complete the reaction. While still in the molten state, the formed polyether is washed with water until free of base, and then heated to remove the water.

The preparation of two suitable liquid glycidyl polyethers of 2,2-bis(4-hydroxyphenyl)propane for preparation of the unsaturated polyesters are illustrated below:

Polyether A: About 2 mols of bis-phenol A was dissolved in 10 mols of epichlorohydrin and 1 to 2% water added to the remaining mixture. The mixture was then brought to 80° C. and 4 mols of solid sodium hydroxide added in small portions over a period of about 1 hour. During the addition, the temperature of the mixture was held to about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous *liquid* having a viscosity of about 150 poises at 25° C. and a molecular weight of about 350 (measured ebullioscopically in ethylene dichloride). The product had an epoxy value of 0.50 eq./100 g., and an epoxy equivalent weight of about 185-195. For convenience, this product will be referred to hereinafter as Polyether A.

Polyether B: Into a reaction vessel filtted with a stirrer, 1 mol of 2,2-bis(4-hydroxyphenyl)proane, referred to as (bis-phenol A), and 1.88 mols of sodium hydroxide as a 10% aqueous solution are introduced and heated to about 45° C. whereupon 1.57 mols of epichlorohydrin are added rapidly while agitating the mixture. The temperature is then adjusted so that the mixture is heated at about 100° C. to 105° C. for about 80 minutes. The mixture separates into a two-phase system and the aqueous layer is decanted. The product is then washed with hot water until neutral to litmus whereupon the resulting polyether is drained and dehydrated by heating at about 150° C.

The polyether has a softening point of about 71° C. (Durrans' Mercury Method). The molecular weight is 850 measured ebullioscopically in ethylene dichloride (average $n=2$), and the epoxide equivalent weight is from about 400 to 500, which is the grams of resin containing one gram-equivalent of epoxide.

It will be appreciated by those skilled in the art that higher (or lower) molecular weight epoxy resins can be made by similar processes by simply varying the ratios of the phenol and epichlorohydrin. Thus, suitable so-called solid epoxy resins are:

Polyether C: An epichlorohydrin/bisphenol A-type solid epoxy resin having a melting point of about 75–85° C. (Durrans' Mercury Method), an epoxide equivalent weight of about 600 to 700 and an average molecular weight of about 1060.

Polyether D: An epichlorohydrin/bisphenol A-type solid epoxy resin having a melting point of about 95 to 105° C. (Durrans' Mercury Method), an epoxide equivalent weight of about 875 to 1025 and an average molecular weight of about 1400.

Polyether E: An epichlorohydrin/bisphenol A-type solid epoxy resin having a melting point of about 125 to 135° C. (Durrans' Mercury Method), an average molecular weight of about 2900 and an epoxide equivalent weight of from about 2000 to 2500.

Improved chemical resistance may also be obtained when the polymer additive is a solid linear polyether resin prepared by condensing a diepoxide such as the diglycidyl ether of 2,2-bis(4-hydroxyphenyl)propane with a dihydric phenol such as 2,2-bis(4-hydroxyphenyl)propane. Suitable such linear polyether resins and their preparation are described in U.S. 3,306,872.

The compositions of the present invention are prepared by mixing the unsaturated polyesters described above with an unsaturated monomer as described hereinafter and then adding to this mixture a solid glycidyl polyether of 2,2-bis(4-hydroxyphenyl)propane. The amount of solid glycidyl polyether added will vary depending upon the desired end properties such as viscosity. Preferably, the amount of the solid glycidyl polyether added will vary from about 0.1 to about 25 parts per 100 parts of unsaturated polyester or its solution in one of the hereinafter described unsaturated monomers. More preferably, the amount of the solid glycidyl polyether polymer and unsaturated polyester will vary from about 1 to about 10 parts by weight of solid glycidyl polyether polymer to 100 parts by weight of the unsaturated polyester prepared by reacting a liquid polyepoxide with an ethylenically unsaturated monocarboxylic acid.

The mixing can be accomplished over a wide range of temperatures. In most cases, the mixing would take place at room temperature and it is preferably conducted at or near room temperature. The mixing, however, can be accomplished advantageously at temperature ranges from 25° C. to 75° C., particularly if the polymer additive is solid or a thick liquid.

The mixing can be accomplished in the presence of solvents or diluents. In some cases, it is preferred to employ monomers and preferably those containing an ethylenic $>C=C<$ group generally used with unsaturated polyesters such as, for example, styrene, methyl methacrylate, butadiene, acrylonitrile, methacrylonitrile, diallyl phthalate, allyl propionate, isoprene, diallylmaleate, divinyl adipate, dichlorostyrene, ethylene glycol diacrylate alpha-methylstyrene, vinyl naphthalene, vinyl phenol, divinyl benzene, vinyl benzoate, triallyl cyanaurate, vinyl chloride, vinylidene chloride, propylene, isobutylene, methyl pentadiene, vinyl pyrrolidone, vinylpyridine, diethyl maleate, and the like. These are preferably used in amounts varying from about 1% to 70% by weight.

The compositions obtained by the above described process will be soluble in solvents such as benzene, acetone and the like and will possess ethylenically unsaturated bonds and can be cured in the presence of peroxides to form insoluble infusible products.

The compositions formed by the above process can be cured by heating with peroxide catalysts (e.g., 1% to 10% by weight) to form valuable products. They may be utilized, for example, to form various types of coating and impregnating compositions or in making cast or molded plastic articles. The compositions are particularly suited for use in making laminated products as they have ability to adhere to the substrate and to be cured under conventional limited conditions to form hard heat resistant products having good chemical resistance.

As hereinbefore noted, the compositions are specifically suited for preparing glass laminated products since they impart outstanding resistance to NaOH and other chemical solutions heretofore unobtainable by these polyesters.

In making the laminates one may apply as by dipping, painting, spraying or padding the desired prepolymer composition or solution onto the substrate, removing any excess material and then subjecting the resulting product to the desired pressure and temperature to effect a cure. The material treated in this manner may be regular sheets of cloth, paper or wool and the like, or may be strands or fibers which may be alternately woven or wound into the desired composite structure. The new compositions are particularly suited for use in the filament winding technique in that they can be easily applied to the glass strands and treated material wound on the mandrel to form the desired laminated product. The products are then subjected to conventional pressures and temperatures for curing, e.g., 20° C. to 300° C. and pressure 15 p.s.i. to 2000 p.s.i.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise specified, parts described in the examples are parts by weight.

EXAMPLE I

This example illustrates the preparation of a composition using an unsaturated polyester obtained by reacting a liquid diglycidyl ether of 2,2-bis(4-hydroxyphenyl)propane herein referred to as Polyether A and methacrylic acid:

The unsaturated polyester was prepared as follows:
68.8 parts of Polyether A were combined with 31.2 parts of glacial methacrylic acid and 0.43 part of tetramethyl ammonium chloride and the mixture heated at 115° C. for 1 hour and 15 minutes. During that time, the acidity changed from 0.362 eq./100 g. to about 0.017 eq./100 g. indicating there was substantially complete reaction. The resulting product was an acetone soluble viscous liquid polyester identified as having the following structure:

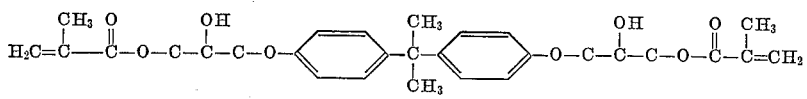

The yield was 100%. This polyester was combined with styrene to form a 50% styrene solution. Such a solution had a viscosity of 16.5 cps.

Glass mat laminates were prepared and cured at 115° C. using the above composition containing 1% by weight of ditertiary butyl peroxide. The flexural strength of the laminate was determined and then the laminates were exposed to various chemical solutions at 99° C. After a one-year exposure, the flexural strength was again determined.

Another set of glass mat laminates were prepared as described above wherein the unsaturated polyester contained the following composition (parts by weight):

Unsaturated polyester prepared by reacting Polyether
  A with methacrylic acid _____ 40
Polyether E (solid polyepoxide resin defined hereinbefore) _____ 10
Styrene _____ 50

The glass laminates were tested as hereinbefore described. The comparative data are tabulated in Table I.

TABLE I

| Chemical solution | Retention of flexural strength after exposure for one year, percent | |
|---|---|---|
| | Unmodified polyester | Solid polyepoxide-modified polyester |
| 25% H₂SO₄ | 53 | 83 |
| 5% HNO₃ | 56 | 64 |
| 15% HCl | 36 | 74 |
| 5% NaOH | 23 | 49 |
| 25% CH₃COOH | 41 | 80 |
| Distilled H₂O | 44 | 91 |

The comparative data clearly shows that the addition of 10% by weight of a solid glycidyl polyether of 2,2-bis(4-hydroxyphenyl)propane significantly improves the chemical resistance of the unsaturated polyester.

EXAMPLE II

The procedures of Example I were substantially repeated wherein the unsaturated polyester is prepared by reacting Polyether A with acrylic acid. Related improved chemical resistance is obtained.

EXAMPLE III

The procedures of Example I were substantially repeated wherein the unsaturated polyester is prepared by reacting diglycidyl resorcinol with methacrylic acid. Related results are obtained.

EXAMPLE IV

The procedures of Example I were substantially repeated wherein the styrene is replaced with each of the following: vinyl toluene, vinyl acetate, N-vinyl pyrrolidone, allylidene diacetate, triallyl cyanurate, diethyl maleate, diethyl fumarate, fumaronitrile, butyl methacrylate, methyl methacrylate, alpha-methyl styrene, divinyl benzene, acrylamide, vinyl 2-chloroethyl ether, acrylonitrile, and divinyl succinate. Related results are obtained.

EXAMPLE V

The procedures of Example I were substantially repeated wherein the ratio of unsaturated polyester to styrene is as follows: 90:5, 85:15, 60:40 and 25:75. Related results are obtained in each instance.

EXAMPLE VI

The procedures of Example I were substantially repeated wherein glycidyl polyether E is replaced with Polyether D and with a solid glycidyl polyether of 2,2-bis(4-hydroxyphenyl)propane having an epoxy value of 0.03 eq./100 g. and an average molecular weight of 3750. Related results are obtained in each instance.

EXAMPLE VII

The procedures of Example I were substantially repeated wherein the laminating composition comprised (A) 35 parts by weight of unsaturated polyester (Polyether A/methacrylic acid), 15 parts by weight of Polyether E and 50 parts by weight of styrene or (B) 45 parts by weight of unsaturated polyester (Polyether A/methacrylic acid), 5 parts by weight of Polyether E and 50 parts by weight of styrene. In each instance improved chemical resistance is obtained.

EXAMPLE VIII

The procedures of Example I are substantially repeated wherein the tetramethyl ammonium chloride is replaced with an equivalent amount of triphenyl phosphine, tributyl phosphine or triethylamine. Related results are obtained in each instance.

I claim as my invention:

1. A curable composition which imparts improved chemical resistance and reduced tack to glass laminates comprising a mixture of (1) 100 parts by weight of an unsaturated polyester prepared by reacting in approximately chemical equivalent amounts (a) a liquid glycidyl polyether of a polyhydric phenol or a polyhydric alcohol having an average molecular weight below about 900 and (b) an ethylenically unsaturated monocarboxylic acid and (2) from 0.1 to 25 parts by weight of a solid unesterified glycidyl polyether of a polyhydric phenol or a polyhydric alcohol having a molecular weight above about 900.

2. A composition as in claim 1 wherein the unsaturated polyester is the reaction product of a glycidyl polyether of 2,2-bis(4-hydroxyphenyl)propane and an ethylenically unsaturated monocarboxylic acid.

3. A composition as in claim 2 wherein the ethylenically unsaturated monocarboxylic acid is methylacrylic acid.

4. A composition as in claim 2 wherein the ethylenically unsaturated monocarboxylic acid is acrylic acid.

5. A composition as in claim 1 wherein the solid glycidyl polyether is a glycidyl polyether of 2,2-bis(4-hydroxyphenyl)propane having an average molecular weight of from about 900 to about 5000.

6. A composition as in claim 1 containing from 1 to 70% by weight of a dissimilar ethylenically unsaturated monomer.

7. A composition as in claim 6 wherein the dissimilar ethylenically unsaturated monomer is styrene.

8. A composition comprising the mixture of (1) an unsaturated polyester of the formula:

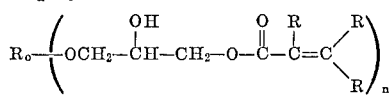

wherein $R_o$ is an aromatic radical, R is a member of the group consisting of hydrogen and alkyl radicals, and $n$ is an integer of 2 to 4, and (2) from 0.1 to 25 parts per 100 parts by weight of the unsaturated polyester of a solid unesterified glycidyl polyether of 2,2-bis(4-hydroxyphenyl)propane having an average molecular weight of from about 900 to about 5000.

9. A composition as in claim 8 containing 1% to 70% by weight of styrene.

10. A composition as in claim 8 wherein the solid glycidyl polyether has an average molecular weight of about 2900.

11. A curable composition which imparts improved chemical resistance and reduced tack to glass laminates comprising a mixture of (1) 100 parts by weight of an unsaturated polyester prepared by reacting in approximately chemical equivalent amounts of
  (a) a liquid glycidyl polyether of a polyhydric phenol having an average molecular weight below about 900 and
  (b) an ethylenically unsaturated monocarboxylic acid, in the presence of from 0.05 to 3% by weight of (a) and (b) of a catalyst selected from the group consisting of tertiary amines, phosphines, and onium compounds.

(2) from 1 to 10 parts by weight of a solid unesterified glycidyl polyether of 2,2-bis(4-hydroxyphenyl)propane having an average molecular weight of from about 900 to about 5000, and (3) from about 1 to about 200 parts by weight of styrene.

12. A composition as in claim 11 wherein the unsaturated polyester has substantially the following structure:

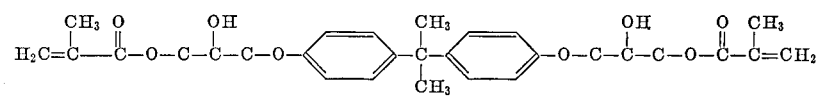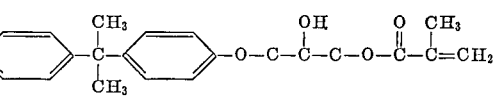

13. A composition as in claim 11 wherein the solid glycidyl polyether has an average molecular weight of about 2900 and an epoxide equivalent weight of about 2000 to 2500.

References Cited

UNITED STATES PATENTS

| | | | |
|---|---|---|---|
| 2,824,851 | 2/1958 | Hall | 260—837 |
| 3,377,406 | 4/1968 | Newey | 260—837 |
| 3,002,959 | 10/1961 | Hicks | 260—837 |
| 3,373,075 | 3/1968 | Fekete | 260—837 |
| 3,301,743 | 1/1967 | Fekete | 260—837 |
| 3,317,465 | 5/1967 | Doyle | 260—837 |

PAUL LIEBERMAN, Primary Examiner

U.S. Cl. X.R.

161—184, 185; 260—47 Ep, 830 TW, 836